March 24, 1931.　　A. C. MATHIESON　　1,797,431

BRAKING SYSTEM

Filed March 21, 1928

INVENTOR
ANDREW C MATHIESON
BY *Wm. M. Cady*
ATTORNEY

Patented Mar. 24, 1931

1,797,431

UNITED STATES PATENT OFFICE

ANDREW C. MATHIESON, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKING SYSTEM

Application filed March 21, 1928. Serial No. 263,281.

This invention relates to fluid pressure brakes, and more particularly to a combined automatic and direct fluid pressure brake system adapted for controlling the brakes on motor vehicle trucks and trailers.

One object of my invention is to provide a fluid pressure brake equipment for motor vehicles, in which means are provided for preventing loss of fluid under pressure on the truck, in case the trailer becomes accidentally separated from the truck.

Another object of my invention is to provide means for preventing release of the brake on the truck, in case the trailer becomes separated from the truck.

Figure 1:
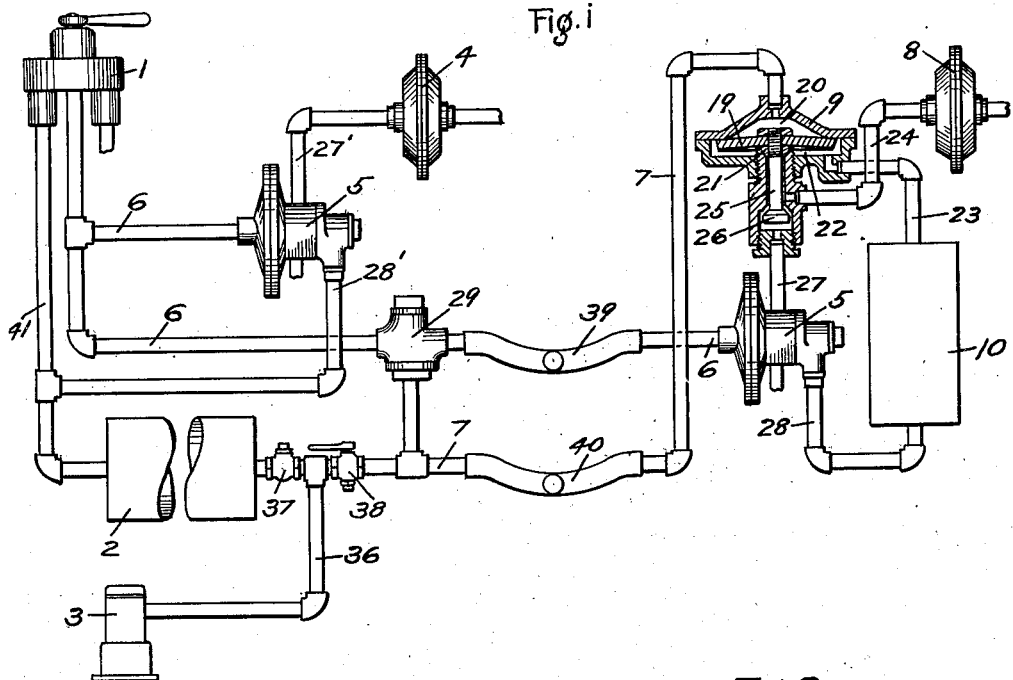
Figure 2:
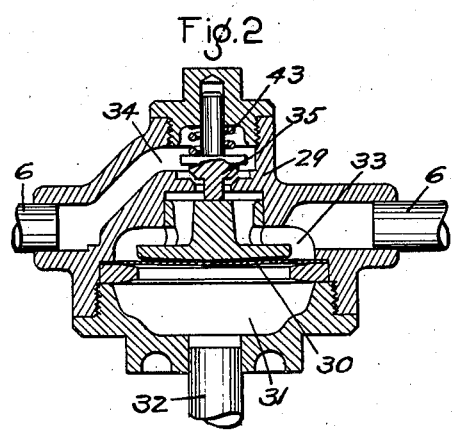
Figure 3:
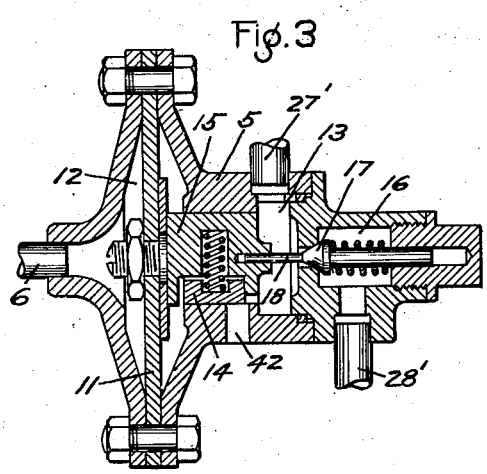

In the accompanying drawing; Fig. 1 is a diagrammatic view, partly in section of a motor vehicle truck and trailer fluid pressure brake system embodying my invention; Fig. 2 a sectional view of the valve device for preventing the release of the brakes on the truck; and Fig. 3 a sectional view of the straight air application and release valve device.

As shown in the drawing, the equipment may comprise on the truck, a brake valve device 1, a main reservoir 2, a fluid compressor 3, a brake chamber 4, a straight air application and release valve device 5, a straight air pipe 6, and an emergency brake pipe 7.

The trailer equipment may comprise a brake chamber 8, a straight air application and release valve device 5, an emergency valve device 9, and an auxiliary reservoir 10.

The application and release valve device 5, used on both the truck and trailer, may comprise a casing having therein a flexible diaphragm 11, the chamber 12 at one side of the diaphragm being connected to the straight air pipe 6, and valve chamber 13 at the opposite side containing a release valve 14 adapted to be operated by a stem 15 carried by the diaphragm 11. The casing also has a valve chamber 16, containing a poppet valve 17 having a stem 18 adapted to be operated by the stem 15.

The emergency valve device 9 may comprise a casing containing a flexible diaphragm 19 having its periphery free from the casing so that the diaphragm acts as a valve, the chamber 20 at one side of which is connected to the emergency brake pipe 7. Carried by the diaphragm 19 is a valve 21 which controls communication from chamber 22, to which the auxiliary reservoir 10 is connected by pipe 23, to pipe 24, leading to the brake chamber 8. The diaphragm 19 also carries a stem 25, having a valve 26 which controls communication from pipe 27, leading to valve chamber 13, to pipe 24.

A valve device 29 is also provided on the truck comprising a casing having mounted therein a flexible diaphragm 30, the chamber 31 at one side of which is connected by a pipe 32 with the emergency brake pipe 7. Chamber 33 at the opposite side is connected to straight air pipe 6 at the trailer side. The brake valve side of pipe 6 is connected to a valve chamber 34, containing a valve 35 adapted to be operated by the diaphragm 30.

The fluid compressor 3 is connected to the emergency pipe 7, through pipe 36 and a check valve 37 is interposed between the pipe 36 and the main reservoir 2. The straight air pipe of the truck is connected to the straight air pipe of the trailer through the usual flexible hose connections 39 and the emergency brake pipe on the truck is connected to the emergency brake pipe on the trailer through flexible hose connections 40.

In operation, the main reservoir 2 is charged with fluid under pressure by operation of the compressor 3 and with the cut-out cock 38 in open position, fluid under pressure is supplied by the compressor through the emergency brake pipe 7 to the trailer.

On the trailer, fluid flows from the brake pipe 7 to chamber 20 of the emergency valve device 9 and passes around the free periphery of the diaphragm 19, charging the auxiliary reservoir 10 with fluid under pressure. Valve 21 is held seated by the fluid pressure acting in chamber 20 on diaphragm 19, while valve 26 is held unseated.

When the brake valve 1 is in release position, straight air pipe 6 is connected to the atmosphere and the brakes are held released. When the brake valve is turned to application position, fluid under pressure is supplied from the main reservoir 2, through pipe 41, to the straight air pipe 6 and the diaphragm 11 of the application and release valve device 5 on the truck is moved by straight air pipe pressure, so as to cause the valve 14 to first cut off communication from valve chamber 13 and the brake chamber 4 to the atmospheric port 42 and then operate the stem 18 so as to unseat the valve 17. Fluid under pressure is then supplied from the main reservoir 2 through pipe 28′ to pipe 27′ and the brake chamber so as to effect an application of the brakes on the truck.

On the trailer, the valve device 5 is similarly operated by straight air pipe pressure, so that fluid under pressure is supplied from the auxiliary reservoir 10, through pipe 28 to pipe 27 and thence past the open valve 26 to pipe 24 and the brake chamber 8.

If the trailer should separate from the truck, fluid will be vented from the emergency pipe 7 on the trailer and this will cause the diaphragm 19 of the emergency valve device 9 to be shifted by the auxiliary reservoir pressure in chamber 22, so that the valve 26 is seated, while the valve 21 is unseated. The unseating of valve 21 permits the flow of fluid from the auxiliary reservoir 10 past the valve 21 to pipe 24 and the brake chamber 8 so as to cause an application of the brakes on the trailer.

On the truck, in case of a break-in-two, the brakes may be applied by operation of the brake valve device 1, since the check valve 37 prevents loss of fluid from the main reservoir 2 when the emergency brake pipe 7 is opened to the atmosphere, by the separation of the trailer from the truck.

When the trailer is separated from the truck, the pressure in the brake pipe 7 being reduced, the pressure in chamber 31 is also reduced, so that the diaphragm 30, being now subject on opposite sides to atmospheric pressure, permits the spring 43 to move the valve 35 to its seat. Communication from the straight air pipe on the truck to the straight air pipe leading to the trailer is thus cut off, so that when the brake valve 1 is operated to effect an application of the brakes on the truck, fluid supplied by the brake valve device to the straight air pipe will not escape through the opening of the straight air pipe due to the separation of the trailer from the truck.

By closing the cut-out cock 38, the brakes on the truck may be controlled when no trailer is attached, since the closing of the cut-out cock permits the pressure in the main reservoir 2 to be maintained by the operation of the compressor 3.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a motor vehicle truck and trailer brake, the combination with a straight air pipe and an emergency brake pipe, of a valve device on the truck and a valve device on the trailer operated by an increase in pressure in the straight air pipe for effecting an application of the brakes on the truck and trailer, a valve device on the trailer operated upon a reduction in brake pipe pressure for effecting an application of the brakes, and a valve device on the truck operated upon a reduction in brake pipe pressure for cutting off communication from the truck through the straight air pipe to the trailer.

2. In a motor vehicle truck and trailer brake, the combination with a straight air pipe and an emergency brake pipe, of a valve device on the truck operated upon a reduction in pressure in the emergency brake pipe for cutting off communication through the straight air pipe, from the truck to the trailer.

3. In a motor vehicle truck and trailer brake, the combination with a straight air pipe and an emergency brake pipe, of a valve device on the truck comprising a valve for controlling communication from the truck side of the straight air pipe to the trailer side of the straight air pipe and a diaphragm subject to brake pipe pressure and operated by brake pipe pressure for maintaining said valve in its open position.

4. In a motor vehicle truck and trailer brake, the combination with a straight air pipe and an emergency brake pipe, of a main reservoir on the truck, a check valve, a compressor for supplying fluid under pressure to the main reservoir through said check valve and directly to the brake pipe, and a valve device on the truck operated upon a reduction in brake pipe pressure for cutting off communication from the truck side of the straight air pipe to the trailer side of the straight air pipe.

In testimony whereof I have hereunto set my hand.

ANDREW C. MATHIESON.